United States Patent
Shamshoum et al.

(10) Patent No.: US 6,559,088 B1
(45) Date of Patent: *May 6, 2003

(54) ZIEGLER-NATTA CATALYST WITH AMINE FOR POLYMERIZATION

(75) Inventors: Edwar Shoukri Shamshoum, Houston, TX (US); Hong Chen, Alpharetta, GA (US); Margarito Lopez, Pasadena, TX (US)

(73) Assignee: Fina Technology, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,103

(22) Filed: Feb. 22, 1999

(51) Int. Cl.[7] .................... B01J 31/00; B01J 37/00; C08F 4/02; C08F 4/60
(52) U.S. Cl. .................. 502/115; 502/103; 502/123
(58) Field of Search ................ 502/103, 117, 502/121, 123, 124, 119, 118, 128, 132, 133, 115

(56) References Cited

U.S. PATENT DOCUMENTS

| | | | | |
|---|---|---|---|---|
| 4,211,671 A | * | 7/1980 | Hoff .................. | 252/431 N |
| 4,496,660 A | | 1/1985 | Gessell et al. ........... | 502/111 |
| 4,499,198 A | * | 2/1985 | Pullukat et al. .......... | 502/104 |
| 4,544,646 A | * | 10/1985 | Pullukat et al. .......... | 502/109 |
| 4,892,914 A | * | 1/1990 | Hefner ................. | 526/114 |
| 5,039,766 A | * | 8/1991 | Sasaki et al. ............ | 502/103 |
| 5,194,534 A | * | 3/1993 | Bell ................... | 526/161 |
| 5,258,476 A | * | 11/1993 | Sasaki et al. ............ | 526/161 |
| 5,529,966 A | * | 6/1996 | Luciani et al. .......... | 502/117 |
| 5,565,396 A | * | 10/1996 | Frey et al. ............. | 502/113 |
| 6,017,842 A | * | 1/2000 | Rosen et al. ............ | 502/129 |
| 6,232,256 B1 | * | 5/2001 | Yang et al. ............. | 502/107 |
| 6,306,984 B1 | * | 10/2001 | Agapiou et al. .......... | 526/154 |

FOREIGN PATENT DOCUMENTS

| | | | | |
|---|---|---|---|---|
| BE | 757.988 | * | 4/1971 | ........... 526/161 |
| DE | 2 030 753 | * | 2/1971 | |
| EP | 0044665 | | 1/1982 | |
| EP | 0 104 374 | * | 4/1984 | |
| EP | 0104374 | | 4/1984 | |
| JP | 40-15980 | * | 7/1965 | ........... 526/161 |
| JP | 41-5379 | * | 3/1966 | ........... 526/161 |
| JP | 42-11646 | * | 7/1967 | ........... 526/161 |

OTHER PUBLICATIONS

Y. Tajima et al., J. Polym. Sci., Polym. Chem. Ed., vol. 6, No. 1, pp. 241–242 (1968).*

* cited by examiner

*Primary Examiner*—Mark L. Bell
*Assistant Examiner*—J. Pasterczyk
(74) *Attorney, Agent, or Firm*—Conley, Rose & Tayon

(57) ABSTRACT

Provided is a catalyst system for polymerization of monomer having at least one Ziegler-Natta polymerizable bond comprising:

c) a supported Ziegler-Natta transition metal catalyst component comprising a Group 15 atom having two groups selected from the group consisting of alkyl and aryl, wherein the support is a magnesium halo dialkylamide; and d) an effective co-catalyst.

16 Claims, 4 Drawing Sheets

ZIEGLER-NATTA CATALYST WITH AMINE FOR POLYMERIZATION

FIELD OF THE INVENTION

This invention relates to the use of catalyst system for the polymerization of olefins, particularly, to catalyst system comprising supported, often with $MgCl_2$, Ziegler-Natta catalyst which has been modified with an amine, preferably during synthesis. The catalyst system is used to polymerize monomer having at least one Ziegler-Natta polymerizable bond, particularly olefin, especially α-olefin, such as ethylene, propylene or their combinations with or without other monomer.

BACKGROUND OF THE INVENTION

It is known that polyolefin manufacturing or production processes typically involve the polymerization of olefin monomer with an organometallic catalyst of the Ziegler-Natta type. Catalyst systems for the polymerization of olefins are well known in the art. Generally, these systems include a Ziegler-Natta type, which may be called a conventional or multi-site, polymerization catalyst component and a co-catalyst, often an organoaluminum compound. Examples of such catalyst systems are shown in the following U.S. Patents the disclosures of which are hereby incorporated by reference.

It is known that $Cp_2TiCl_2$ in the presence of alkylaluminum compounds polymerizes ethylene but not propylene whereas in the presence of methylalumoxane (MAO), $Cp_2TiCl_2$ polymerizes propylene also to produce atactic polypropylene. Combination of dimethyl titanocene and its Cp-substituted analogues and $TiCl_3$ for propylene polymerizations has been reported in U.S. Pat. No. 2,992,212 and by G. A. Lock in "Thermoplastic Elastomers Based on Block Copolymers of Ethylene and Propylene", *Advances in Polyolefins* (Seymour, Raymond B., ed.) at pages 59–74. MAO was not used in this polymerization.

Typically catalysts for traditional polymerization of olefin monomer include a Ziegler-Natta-type polymerization catalyst component, a co-catalyst which is generally an organoaluminum compound, and an external electron donor or selectivity control agent, often an organosilicon compound. Such catalysts are described in U.S. Pat. Nos. 4,107,413; 4,294,721; 4,439,540; 4,115,319; 4,220,554; 4,460,701; and 4,562,173.

A Ziegler-Natta type polymerization catalyst is basically a complex derived from a halide of a transition metal, for example, titanium, chromium or vanadium with a metal hydride and/or a metal alkyl, typically an organoaluminum compound, as a co-catalyst. The catalyst is usually comprised of a titanium halide supported on a magnesium compound complexed with an alkylaluminum co-catalyst.

SUMMARY OF THE INVENTION

Our invention provides, at least, new Ziegler-Natta type polymerization catalyst with useful characteristics and ability to make useful polymer.

Use of our catalyst and practice of other aspects of our invention also yields useful and unusual polymer properties in polymerization processes using a supported Ziegler-Natta catalyst which has been modified with an amine compound.

We also provide, with this invention, ability to produce Ziegler-Natta polymerized polymer having low molecular weight and narrow molecular weight distribution.

Additionally, our invention improves catalyst activity by modifying the catalyst, usefully this is performed during synthesis.

These and other objects are accomplished by use of catalyst system comprising a supported Ziegler-Natta catalyst modified with Group 15 compound, preferably amine, in polymerization process for polymerizing monomer having at least one Ziegler-Natta polymerizable bond, notably olefins, especially ethylene.

DETAILED DESCRIPTION

Figure 1:
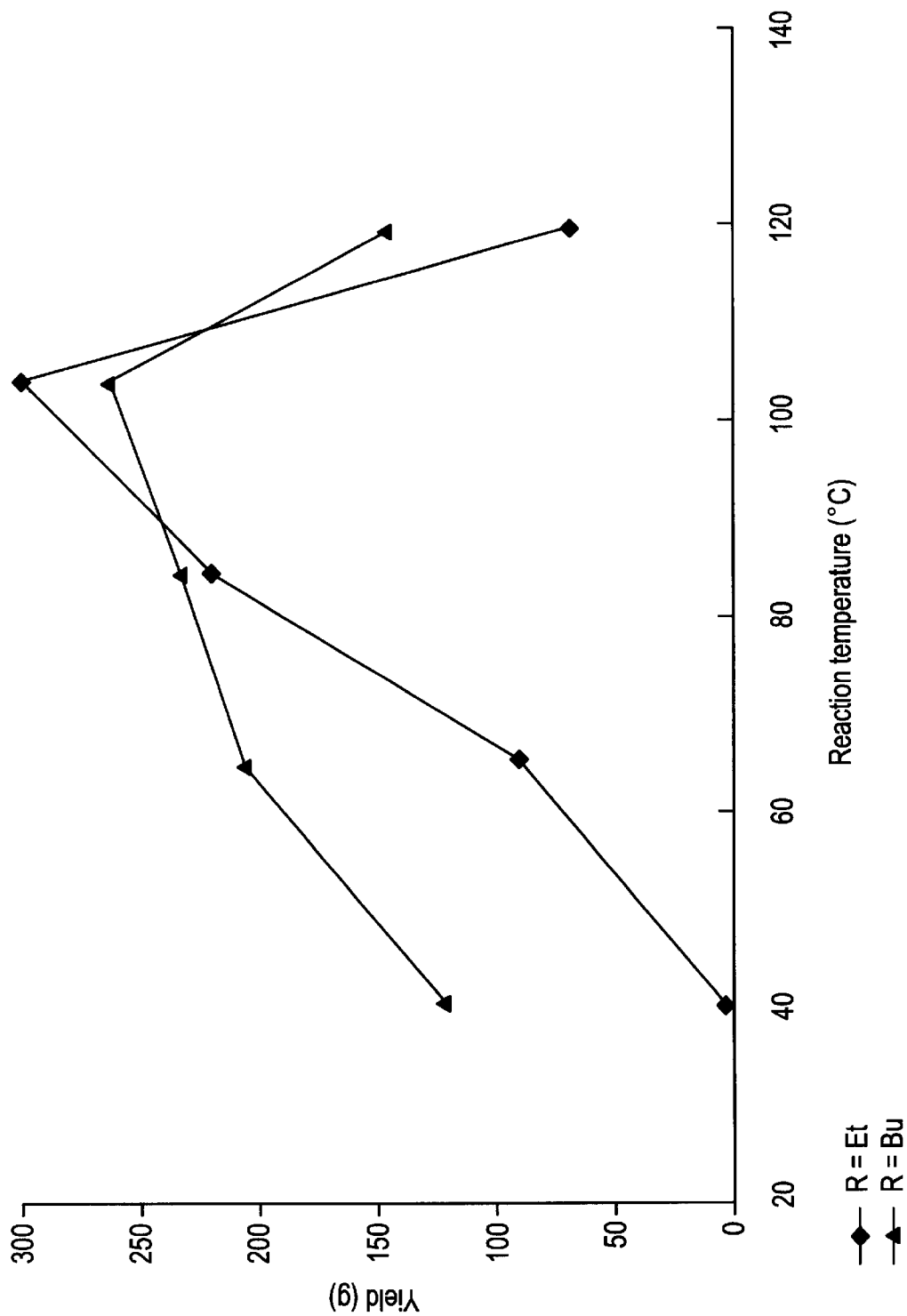
FIG. 1 graphically presents productivity or catalyst yield plotted against reaction temperature for catalysts wherein R=Et and R=Bu.
Figure 2:
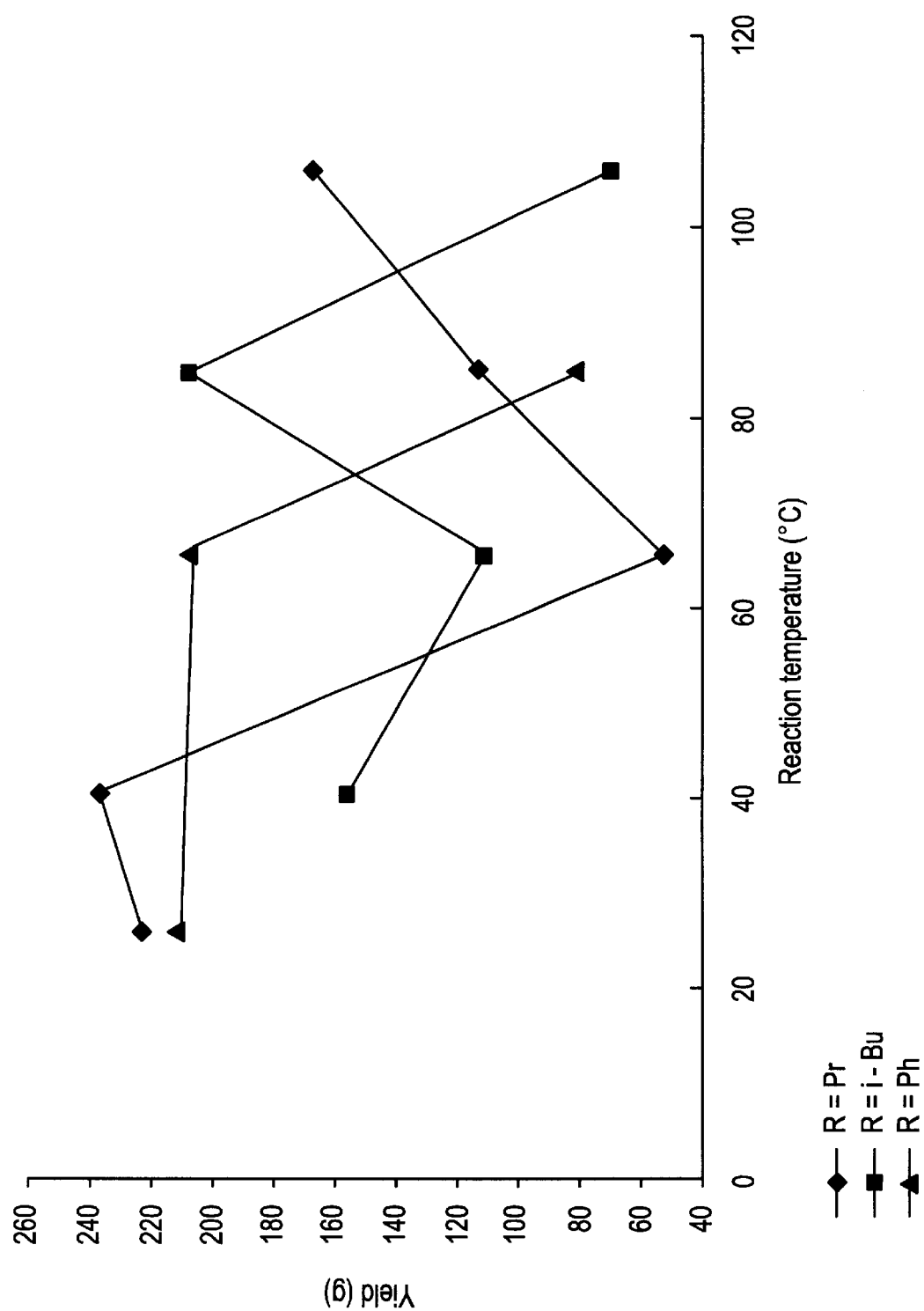
FIG. 2 provides a similar graphic presentation for catalysts wherein R=Pr, R=iBu, and R=Ph.
Figure 3:
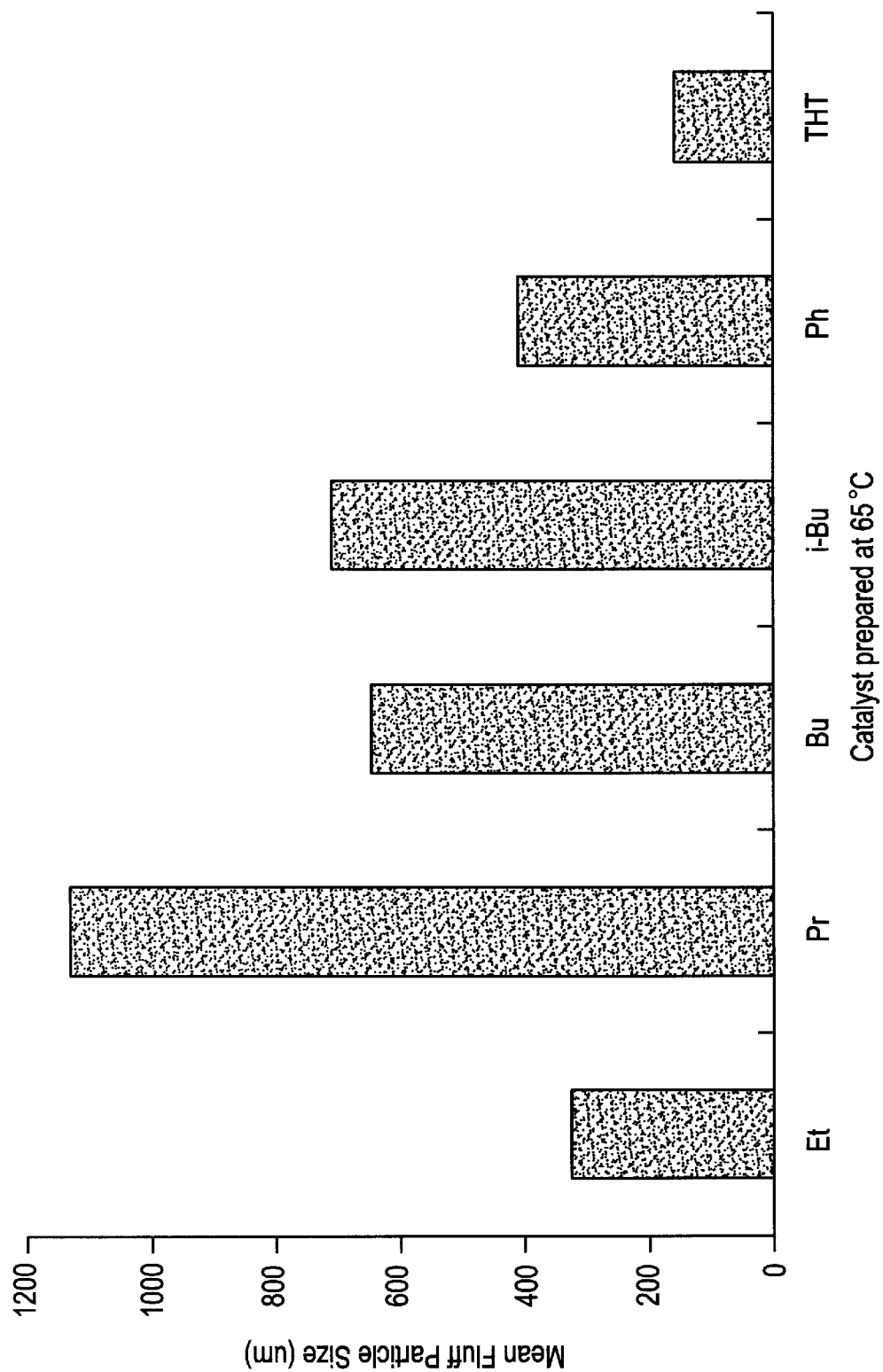
FIG. 3 presents fluff (polymerization reactor product) particle size distribution as a function of R group variation on our amide catalysts.
Figure 4:
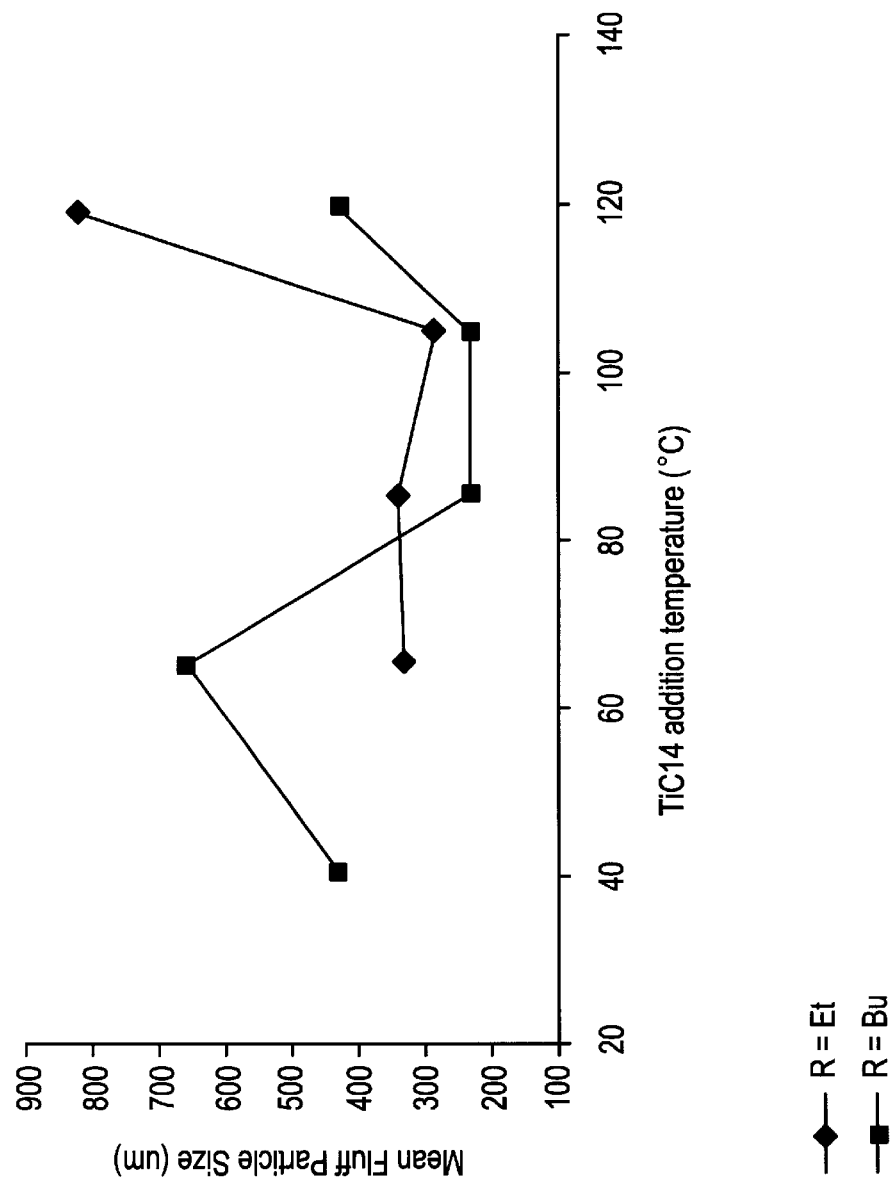
FIG. 4 presents fluff particle size distribution as a function of $TiCl_4$ addition temperature during catalyst synthesis for catalysts wherein R=Et and R=Bu.

This invention provides several embodiments of the catalyst system for polymerization of monomer having at least one Ziegler-Natta polymerizable bond comprising:

a) supported Ziegler-Natta transition metal catalyst component modified with an amine compound; and b) effective co-catalyst.

The present invention also provides process for the polymerization of olefins using the catalyst system described above comprising:

a) selecting a conventional Ziegler-Natta transition metal catalyst component modified with amine;

b) contacting the catalyst component with an effective Ziegler-Natta co-catalyst compound;

c) contacting catalyst system with monomer under polymerization reaction conditions; and d) removing desired polymer.

Usefully, resulting polymer product displays narrow molecular weight distribution.

For each of these embodiments, modification of the catalyst component may be usefully accomplished during its synthesis. Also, for each embodiment the cocatalyst will preferably comprise aluminum compound, especially trialkyl aluminum.

It is known that Ziegler-Natta catalyst may be prepolymerized to improve its catalytic performance. Generally prepolymerization is effected by contacting small amounts of monomer with catalyst system, or catalyst after its contact with selected co-catalyst. Pre-polymerization and its processes are described in U.S. Pat. Nos. 4,767,735, 4,927,797 and 5,122,583, hereby incorporated by reference.

Any of the conventional supported Ziegler-Natta transition metal-compound catalyst components can be used in the present invention. The transition metal compound is preferably of the general formula $MR^1_x$ where M is the metal, $R^1$ is a halogen or a hydrocarbyloxy and x is the valence of the metal. Preferably, M is a Group 4 (Group IVB) metal, more preferably titanium. Preferably, $R^1$ is chlorine, bromine, an alkoxy or a phenoxy, more preferably chlorine or ethoxy and most preferably, chlorine. Illustrative examples of the transition metal compounds are $TiCl_4$, $TiBr_4$, $Ti(OC_2H_5)_3Cl$, Ti(OC$_2$H$_5$)$_3$Cl, Ti (OC$_3$H$_7$)$_2$Cl$_2$, Ti(OC$_6$H$_{13}$)$_2$Cl$_2$, Ti(OC$_2$H$_5$)$_2$Br$_2$ and Ti(OC$_{12}$H$_{25}$)Cl$_3$. Mixtures of the transition metal compounds may be used. No restriction on the number of transition metal compounds is made as long as at least one transition metal compound is present.

The support should be inert, and preferably solid, which is chemically unreactive with any of the components of the conventional Ziegler-Natta catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, carboxylates of magnesium, and combinations thereof. Preferred magnesium compounds will be magnesium halide or dialkoxymagnesium. More preferred is magnesium chloride.

Preferred effective cocatalyst includes aluminum compounds, particularly organoaluminums. The organoaluminum co-catalyst is preferably an aluminum alkyl of the formula AlR$_3$ where R is an alkyl having 1–8 carbon atoms, R' being the same or different. Examples of aluminum alkyls are trimethyl aluminum (TMA), triethyl aluminum (TEAl) and triisobutyl aluminum (TiBAl). The preferred aluminum alkyl is TEAl.

The amine compound is of the general formula NH(R)$_2$ where R is alkyl or aryl group, preferably linear alkyl of two to four carbon atoms.

The standard synthesis procedure is:
 a) selecting a solid component comprising magnesium dialkoxide of the general formula Mg(OR$^2$)$_2$ where R$^2$ is a hydrocarbyl or substituted hydrocarbyl of 1 to 20 carbon atoms;
 b) adding a halogenating agent;
 c) adding a titanating agent; and
 d) adding effective organoaluminum co-catalyst.

The halogenating, preferably chlorinating, agent and the titanating agent may be the same compound, e.g. a titanium halide, usefully titanium tetrachloride (TiCl$_4$).

The synthesis procedure for Ziegler-Natta type catalysts for the polymerization of olefins is disclosed in U.S. Patents the disclosures of which are hereby incorporated. The present invention modifies the synthesis procedure, and thus modifies the catalyst, by adding a Group 15 compound, preferably an amine compound, during synthesis. The specific synthesis procedure used is:
 a) Prepare a magnesium precursor by reacting MgRR' with an amine, the resulting Mg(NR$_2$)$_2$ may then be isolated or used continuously for further reaction;
 b) adding titanium tetrachloride and assuring reaction;
 c) washing with hydrocarbon solvent, preferably heptane;
 d) optionally heat treating; and
 e) drying, preferably under vacuum.

The amine compound was added prior to the addition of titanium tetrachloride. The amount of amine added was 2.2 molar equivalents of MgRR'.

The invention having been generally described, the following examples are given as particular embodiments of the invention and to demonstrate the practice and advantages thereof. It is to be understood that the examples are given by way of illustration and are not intended to limit the specification or the claims to follow in any manner.

EXAMPLES

Preferred precursors for the catalysts, dialkyl magnesium amide Mg(NR$_2$)$_2$, are readily obtained by reacting magnesium alkyl, butyl ethyl magnesium (BEM) may be used beneficially, with dialkyl amine (R$_2$NH) with the following chemical reaction:

$$MgRR'+2R_2NH \rightarrow Mg(NR_2)_2+RH+R'H$$

such that R=any straight, branched, cyclic, or combinations alkyl or aryl group of up to about 20 carbon atoms.

The reaction occurs very rapidly in all cases, although the form of the final product Mg(NR$_2$)$_2$ (either a liquid, a fine powder or a crystalline material) depends on the alkyl group.

Preferred Catalyst preparation

Preparation of the Mg(NR$_2$)$_2$ precursors (R=Bu and Pr)

Unless otherwise stated, all manipulations were conducted under inert atmosphere. 180 ml butyl ethyl magnesium (BEM) (3.4% Mg in heptane, 0.18 mole) was charged into a 1 liter three-neck round bottom flask equipped with a refluxing condenser with a gas inlet, a magnetic stirrer bar and a 125 ml pressure equalizing dropping funnel. 150 ml of heptane was added to BEM, and the solution was stirred at room temperature (RT). 2.2 molar equivalents of R$_2$NH (67.4 ml for R=Bu and 50 ml for R=Pr) was added dropwise to the stirred BEM solution at RT in about 45 minutes. There was notable gas evolution from the reaction and a pale yellow, slightly cloudy solution was obtained. The reaction mixture was heated to 85° C. and held for two hours. The container bearing the yellow solution was evacuated at 70–75° C. for 1 hour; a thick yellow material of tar-like consistency resulted. The yellow "tar" was suspended in 100 ml. hexane and redissolved when heated to 70° C. The solvent was evacuated at 85° C. The resulting yellow semi-solid was placed in a freezer for 0.5 to 1 hr. The bright yellow crystalline material thus formed became loose by gentle tapping on the flask.

Preparation of Precursor Mg(NEt$_2$)$_2$

A 180 ml. portion of BEM (3.4% Mg in heptane, 0.18 mole) was charged into a 1 liter three-neck round bottom flask equipped with a refluxing condenser with a gas inlet, magnetic stirrer bar, and a 125 ml. pressure equalizing dropping funnel. 180 ml. of heptane was added to the BEM solution. The solution was placed and maintained in an ice/water bath and stirred at 5° C. 40.2 ml Et$_2$NH (2.2 molar equivalents) was diluted with 40 ml heptane in the dropping funnel and added dropwise to the stirred BEM solution at 0–5° C. in about 40 minutes. White, fine precipitate formed immediately. The reaction mixture became viscous initially but soon became free-flowing. After the addition of Et$_2$NH was finished, the reaction mixture was stirred at RT for 3 hours, then heated to 55° C. and stirred for one more hour. The reaction mixture was allowed to settle at 55° C. The supernatant was decanted and the white solid was washed twice with 100 ml heptane. The final solid residue was dried in vacuo at 55° C. for 2 hours. The fine white powder thus obtained has low bulk density.

Preparation of Mg[N(i-Bu)$_2$]$_2$

A 90 ml portion of butyl ethyl magnesium (BEM) (3.4% Mg in heptane, 0.09 mole) was charged into a 1 liter three-neck round bottom flask equipped with a refluxing condenser with a gas inlet, a magnetic stirrer bar and a 60 ml pressure equalizing dropping funnel. 90 ml of heptane was added to the BEM solution, which was stirred at room temperature (RT). 33 ml di-isobutyl amine (2.2 molar equivalents) were added dropwise to the stirred BEM solution at RT in about 20 minutes. There was notable gas evolution from the reaction and a cloudy, slightly yellowish solution was obtained. The reaction mixture was heated to 85° C. and held for 2 hours. The cloudy, yellowish solution was evacuated at 75° C. for one hour yielding a light yellow, oily appearing material. This light yellow oil was placed in a freezer for one hour (similar to the treatment for the yellow "tar" obtained with dibutyl and dipropyl amine). However, the oily material did not solidify as in the case of dibutyl and dipropyl amine reaction. The light yellow oil was then redissolved in 50 ml heptane and transferred to a storage tube. 20 ml heptane was used to rinse the original flask and also transferred to the storage tube. The concentration of this stock solution was calculated to be 1.14 M based on the weight of the oily material.

Preparation of $Mg(NPh_2)_2$

A 60 ml portion of BEM (3.4% Mg in heptane, 0.06 mole) was charged into a 500 ml three-neck round bottom flask equipped with a mechanical stirrer and a refluxing condenser with a gas inlet. 160 ml heptane was added to the flask and the solution was stirred at RT. A solid addition tube containing 21.3 g diphenylamine was quickly connected to the flask assembly under argon flow. The white flaky $Ph_2NH$ was added slowly to the stirred solution at room temperature. The reaction was very exothermic and a milky, fine slurry formed immediately. After the addition of $Ph_2NH$, the solid addition tube was rinsed with about 100 ml heptane and transferred to the reaction flask. The reaction mixture was heated to gentle reflux for 2 hours until no further gas evolution occurred. It was then cooled to about 70° C. and allowed to settle. The colorless supernatant liquid was decanted. The white fine powder was washed once with 100 ml heptane, then dried in vacuo for two hours at 70° C.

Preparation of catalyst by $TiCl_4$ treatment of dialkyl magnesium amide $[Mg(NR_2)_2]$ A 3 g portion of dialkyl magnesium amide $[Mg(NR_2)_2]$ (R=Bu, Et, Pr, i-Bu or Ph) was suspended in 60 ml heptane. 7.2 ml $TiCl_4$ (excess) was added dropwise to the suspension at desired reaction temperature over a period of 10 to 15 minutes. Dark brown solids formed immediately. After the $TiCl_4$ addition was finished, the reaction mixture was stirred for another two hours at the $TiCl_4$ addition temperature. The reaction mixture was then allowed to settle. The dark brown supernatant was decanted and the solid was washed three times with 60 ml. heptane. The solid residue was dried in vacuo at 50–60° C. for two hours.

Dialkyl amine used: $Et_2NH$, $Pr_2NH$, $Bu_2NH$, $i-Bu_2NH$, and $Ph_2NH$

The schematic representation below illustrates the general synthetic procedure:

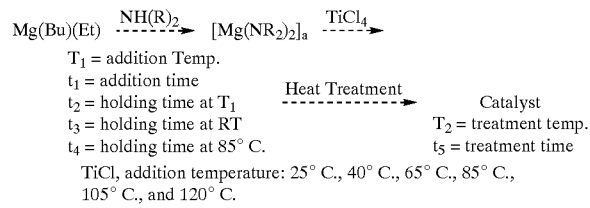

$T_1$ = addition Temp.
$t_1$ = addition time
$t_2$ = holding time at $T_1$
$t_3$ = holding time at RT
$t_4$ = holding time at 85° C.
Heat Treatment
Catalyst
$T_2$ = treatment temp.
$t_5$ = treatment time
$TiCl_4$ addition temperature: 25° C., 40° C., 65° C., 85° C., 105° C., and 120° C.

Several reactant and reaction variations were used in preparing the catalyst samples which were studied. In the case of dibutyl or dipropyl amide, the magnesium amide is soluble in heptane. Therefore a clear yellow solution is formed after the reaction. When the solvent is removed, a yellow tar is formed. Only after being placed in a freezer for a short period of time would the yellow crystalline solid form. The complete removal of the solvent prior to cooling in the freezer is essential for obtaining crystalline material.

In the examples using diethyl or diphenyl amide, the magnesium amide is insoluble in heptane. In either case, fine white powder is formed from the reaction of BEM and dialkyl amine, which can be easily separated from the supernatant and purified.

The solubility of the magnesium amide precursor, which is dictated by the substituent group on the nitrogen atom, has a significant effect on catalyst performance and fluff morphology.

The catalysts were prepared by reacting the precursor $Mg(NR_2)_2$ with $TiCl_4$ at desired reaction temperature for a certain amount of time. The reaction of dialkylmagnesium amide and $TiCl_4$ is very rapid, resulting in active catalysts for ethylene polymerization. The color of the catalyst is brown regardless of the starting material, although the shade varies with the different alkyl groups or different reaction temperatures. The brown color of the catalyst is due to the formation of titanium amide species from the reaction of dialkyl magnesium amide and $TiCl_4$.

The chemical reaction is schematically presented below:

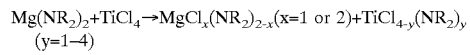

$Mg(NR_2)_2 + TiCl_4 \rightarrow MgCl_x(NR_2)_{2-x}(x=1 \text{ or } 2) + TiCl_{4-y}(NR_2)_y$ (y=1–4)

Titanium amide species are formed during the preparation of the catalysts. Most of the titanium amide species are soluble in heptane and are washed off during the preparation, but some of the amide species remain in the final catalyst, probably incorporated into the $MgCl_2$ support.

Elemental analyses show that the amount of residual nitrogen content in the catalysts ranges from about 2 to 3 wt %. The molar ratio of residual amide to magnesium in the final catalysts ranges from 0.3 to 0.6, which indicates that at least one dialkyl amine group has been replaced by chloride during titanation.

Table I, below, illustrates various catalyst preparation conditions used to prepare catalysts of our examples.

TABLE I

| Example | Solvent | R | $T_1$ ° C. | $t_1$, min | $t_2$, hrs | $t_3$, hrs | $T_2$, ° C. | $t_4$, hrs | Productivity, (g/g/l) |
|---|---|---|---|---|---|---|---|---|---|
| 1 | toluene | $C_4$ | 5 | 10 | n/a | 2 | 120 | 18 | 9100 |
| 2 | heptane | $C_4$ | 0 | 10 | 2 | 2 | none | none | 15,500 |
| 3 | heptane | $C_4$ | 0 | 10 | 2 | 2 | 120 | 18 | 5,900 |
| 4 | heptane | $C_4$ | 23 | 10 | 2 | 2 | none | none | 14,900 |

TABLE I-continued

| Example | Solvent | R | T$_1$, °C. | t$_1$, min | t$_2$, hrs | t$_3$, hrs | T$_2$, °C. | t$_4$, hrs | Productivity, (g/g/l) |
|---|---|---|---|---|---|---|---|---|---|
| 5 | heptane | C$_4$ | 40 | 14 | 18* | 2 | none | none | 23,200 |
| 6 | heptane | C$_4$ | 40 | 6 | 2 | 2 | none | none | 17,800 |
| 7 | heptane | C$_4$ | 85 | 6 | n/a | 2 | none | none | 24,500 |
| 8 | heptane | C$_4$ | 65 | 6 | n/a | 2 | none | none | 29,200 |
| 9 | heptane | C$_3$ | 23 | 15 | 1/3 | 2 | none | none | 11,600 |
| 10 | heptane | C$_3$ | 23 | 15 | 1/3 | 2 | 130 | 18 | 7,800 |
| 11 | heptane | C$_3$ | 23 | 18 | 1 | 1 | 120 | 18 | 9,800 |
| 12 | heptane | C$_2$ | 5 | 20 | 2 | 2 | none | none | 7,200 |
| 13 | heptane | C$_2$ | 6 | 20 | 2 | 2 | 120 | 18 | 8,500 |
| 14 | heptane | C$_2$ | 23 | 60 | n/a | 2 | none | none | 9,700 |
| 15 | heptane | C$_2$ | 23 | 60 | n/a | 2 | 120 | 18 | 6,300 |

*kept at the temperature without stirring.

Polymerization

A four liter reactor was fitted with four mixing baffles and with two opposed-pitch mixing propellers. Ethylene and hydrogen are introduced into the reactor vessel via mass flow controllers while a dome-loaded back-pressure regulator keeps the internal reaction pressure constant. The reaction temperature is maintained (in the reactor jacket) by steam and cold water using a valve linked to a controller.

Hexane is used as diluent and TEAL is used as cocatalyst for all polymerizations.

| Polymerization Conditions | |
|---|---|
| Temperature | 80° C. |
| Reaction Time | 60 minutes |
| Catalyst | 10 mg |
| Cocatalyst | TEAL @ 0.25 mmol/l |
| Flow rates | H$_2$/C$_2$ @ 2/8 SLPM |

Results of polymerization runs using the inventive catalysts are presented in Table II below.

From these results, it may be seen that catalyst synthesis conditions may be used to control MW or MWD of polymer during polymerization.

It is to be understood that the previously provided examples are intended only to assist in providing clear understanding of our invention and its practice. They are not to be viewed as limiting or definitive of the breadth and depth of our invention which is described by the following claims.

We claim:

1. A catalyst system for polymerization of monomer having at least one Ziegler-Natta polymerizable bond comprising:

a) a supported Ziegler-Natta transition metal catalyst component comprising TiCl$_{4-y}$(NR$_2$)$_y$, where y=1–4, wherein the support consists essentially of MgCl$_x$(NR$_2$)$_{2-x}$, where x=1–2, and wherein NR$_2$ is selected from the group consisting of diethyl amide, dipropyl amide, dibutyl amide, diisobutyl amide, and diphenyl amide; and b) an effective co-catalyst.

2. The catalyst system of claim 1 wherein said effective cocatalyst comprises an aluminum compound.

TABLE II

| Example | B.D | dens. | MI5 | HLMI | SR5 | Mn | Mw | Mz | D/D' |
|---|---|---|---|---|---|---|---|---|---|
| 1 | 0.3 | 0.957 | 0.772 | 8.52 | 11.04 | 27461 | 18005 | 10129 | 7.1/5 |
| 2 | 3 | 8 | 1.030 | 7.97 | 9.670 | 33234 | 2 | 12 | .2 |
| 3 | 0.3 | 0.955 | 0.161 | 1.76 | 10.93 | 29557 | 19982 | 88908 | 6.0/4 |
| 4 | 5 | 7 | | | 0 | | 8 | 7 | .4 |
| 5 | 0.2 | 0.953 | | | | | 28977 | 12732 | 9.8/4 |
| 6 | 6 | 2 | | | | | 4 | 80 | .4 |
| 7 | | | | | | | | | |
| 8 | | | | | | | | | |
| 9 | 0.1 | 0.955 | 0.267 | 3.08 | 11.53 | 40990 | 27019 | 14546 | 6.6/5 |
| 10 | 4 | 7 | 0.214 | 2.28 | 6 | 35949 | 1 | 39 | .4 |
| 11 | 0.1 | 0.954 | 0.315 | 3.46 | 10.65 | 40775 | 28259 | 15784 | 7.9/5 |
| | 6 | 6 | | | 4 | | 6 | 28 | .6 |
| | 0.1 | 0.955 | | | 10.98 | | 25119 | 12859 | 6.2/5 |
| | 4 | 2 | | | 4 | | 3 | 54 | .1 |
| 12 | 0.1 | 0.951 | 0.253 | 2.72 | 10.75 | 35549 | 25316 | 11635 | 7.1/4 |
| 13 | 6 | 3 | 0.143 | 1.61 | 0 | 38282 | 9 | 43 | .3 |
| 14 | 0.1 | 0.952 | 0.277 | 3.01 | 11.25 | 30505 | 35994 | 28206 | 9.4/7 |
| 15 | 4 | 0 | 0.215 | 2.59 | 9 | 42437 | 8 | 65 | .8 |
| | 0.1 | 0.966 | | | 10.87 | | 26288 | 17630 | 8.6/6 |
| | 6 | 5 | | | 0 | | 6 | 65 | .7 |
| | 0.1 | 0.954 | | | 12.05 | | 27975 | 12973 | 6.6/4 |
| | 7 | 6 | | | 0 | | 5 | 61 | .6 |

3. The catalyst system of claim 2 wherein said aluminum compound is an organoaluminum.

4. The catalyst system of claim 3 wherein said organoaluminum is an aluminum alkyl of the formula $AlR'_3$ where R' is an alkyl having 1–8 carbon atoms, each R' is the same or different.

5. A Ziegler-Natta catalyst system produced by the process comprising the steps of:
   a) selecting a soluble component comprising a magnesium dialkyl of the general formula $Mg(R^2)_2$ where $R^2$ is a hydrocarbyl or substituted hydrocarbyl of 1 to 20 carbon atoms;
   b) reacting the soluble component with an amine selected from the group consisting of diethyl amine, dipropyl amine, dibutyl amine, diisobutyl amine, and diphenyl amine to form a reaction product;
   c) adding a halogenating agent to the reaction product;
   d) adding a titanating agent, which may optionally be the same as said halogenating agent to the reaction product; and
   e) adding an effective co-catalyst to the reaction product wherein the reaction product comprises a Ziegler-Natta transition metal catalyst component on a support consisting essentially of $MgCl_x(NR_2)_{2-x}$, where x=1–2, and wherein $NR_2$ is the corresponding amide group of the amine selected in step (b).

6. The process of claim 5 wherein the amine is diethyl amine, the halogenating agent and the titanating agent are $TiCl_4$, and the $TiCl_4$ is added at a temperature of from about 65° C. to about 120° C.

7. The process of claim 5 wherein the amine is dipropyl amine, the halogenating agent and the titanating agent are $TiCl_4$, and the $TiCl_4$ is added at a temperature of from about 25° C. to about 40° C. or from about 85° C. to about 105° C.

8. The process of claim 5 wherein the amine is dibutyl amine, the halogenating agent and the titanating agent are $TiCl_4$, and the $TiCl_4$ is added at a temperature of from about 65° C. to about 105° C.

9. The process of claim 5 wherein the amine is diisobutyl amine, the halogenating agent and the titanating agent are $TiCl_4$, and the $TiCl_4$ is added at a temperature of about 40° C. or about 85° C.

10. The catalyst system of claim 5 wherein said magnesium dialkyl is butylethylmagnesium.

11. The catalyst system of claim 10 wherein said cocatalyst comprises an aluminum compound.

12. The catalyst system of claim 11 wherein the halogenating agent is of the general formula $MR^1_x$ where the metal, M, is a group 4 metal, $R^1$ is halogen or hydrocarbyloxy, and x is the valence state of said metal M.

13. The catalyst system of claim 12 wherein said aluminum compound is an organoaluminum.

14. The catalyst system of claim 13 wherein said Group 4 metal is titanium and $R^1$ is chlorine or bromine.

15. The catalyst system of claim 14 wherein said organoaluminum is an aluminum alkyl of the formula $AlR'_3$ where R' is an alkyl having 1–8 carbon atoms, each R' is the same or different.

16. The process of claim 5 wherein the amine is diphenyl amine, the halogenating agent and the titanating agent are $TiCl_4$, and the $TiCl_4$ is added at a temperature of from about 25° C. to about 65° C.

* * * * *